Patented Sept. 1, 1931

1,821,309

UNITED STATES PATENT OFFICE

ERLING JOHNSON, OF ODDA, NORWAY, ASSIGNOR TO THE FIRM: ODDA SMELTEVERK A/S., OF ODDA, NORWAY

PROCESS OF MANUFACTURING COMPOUND FERTILIZERS

No Drawing. Original application filed September 9, 1929, Serial No. 391,507, and in Norway November 24, 1928. Divided and this application filed December 26, 1930. Serial No. 505,004.

In my patent application Ser. No. 391,506, I have described a process of treating phosphate rock and similar phosphate material with nitric acid so as to obtain a solution containing calcium nitrate and free phosphoric acid, from which solution a considerable part of the lime content of the phosphate rock by suitable cooling is crystallized out as $Ca(NO_3)_2.4H_2O$. After separating the calcium nitrate crystals from the solution a mother liquor is left which contains free phosphoric acid, some calcium nitrate and more or less free nitric acid.

The present application, which is a division from my pending patent application Ser. No. 391,507 relates to a process for producing compound fertilizers from said mother liquor.

According to my present invention I use this mother liquor for treating phosphate rock in the presence of potassium sulphate.

The free phosphoric acid and the free nitric acid of the mother liquor will convert the phosphate rock into mono-calcium phosphate and calcium nitrate. The calcium present is converted into gypsum by the potassium sulphate. The entire reaction product is dried and constitutes a concentrated compound fertilizer high in water-soluble phosphoric acid and in potash, but relatively low in nitrogen.

To increase the content of nitrogen so as to form a universal fertilizer with a well balanced ratio of $P_2O_5:K_2O:N$ a suitable quantity of urea may be added to the mother liquor or admixed to the reaction product.

The manner of carrying out my process and the composition of the fertilizer products obtained may by way of example be illustrated by the following data.

*Example 1.*—100 parts of mother liquor resulting from the process described in my patent application Ser. No. 391,506 and containing 30 per cent phosphoric acid ($P_2O_5$), 4.6 per cent CaO as nitrate of calcium, equivalent to 2.3 per cent nitrogen, and further 4.2 per cent nitrogen in the shape of nitric acid, were treated with 40 parts of phosphate rock of 36 per cent in presence of 40 parts finely ground potassium sulphate. The reaction proceeds under evolution of heat. By appropriate supply of some additional heat the reaction is completed in a rather short time. The mass is maintained at 50–70° C. until the product is sufficiently dry. Drying under vacuum may of course also be used.

150 parts of product were obtained with a content of 30.0 per cent phosphoric acid (the by far prevailing portion being water-soluble), 14.7 per cent potash and 4.33 per cent nitrate nitrogen.

*Example 2.*—When 80 parts of the material produced according to Example 1 are mixed with 20 parts of urea, a dry product is obtained which shows the following composition

|  | Relative ratio |
|---|---|
| Some 24 per cent of phosphoric acid | 2 |
| " 12 per cent of potash | 1 |
| " 12 per cent of nitrogen | 1 |

Of the nitrogen 3.5 per cent are nitrate nitrogen and 8.5 per cent urea nitrogen.

The products obtained have excellent physical properties. They are very storable and easy to spread. My process had obvious merits over previous proposed processes for preparing compound fertilizers by treating phosphate rock with nitric acid in the presence of potassium sulphate.

The mother liquor used in my process is practically a solution of phosphoric acid and contains only minor quantities of calcium. Therefore my process leads to far more concentrated fertilizers than it was possible to obtain according to said previous proposals.

As regards the use of urea my process has likewise great merits over previously proposed manners of working.

It has been suggested to convert phosphate rock by means of nitric acid into a solid product of mono-calcium phosphate and calcium nitrate and to add urea to the product in order to remove the deliquescent nature of the calcium nitrate by formation of the complex compound $Ca(NO_3)_2.4CO(NH_2)_2$. In this case however the quantity of urea which must be added is so large, that the final product shows a quite unbalanced ratio of $P_2O_5:N$.

In my process the mother liquor used contains only very little calcium nitrate, as this substance has been previously removed by the foregoing crystallization. The amount of urea which is required for combination with the calcium nitrate present is a very moderate one, and the process allows to prepare a dry storable compound fertilizer with a well-balanced ratio $P_2O_5:N$.

It is understood that the carrying out of my process is not limited to the ratio of components above mentioned. For example, the quantity of phosphate rock may be varied in accordance with the composition of the mother liquor, particularly with regard to the content of free nitric acid in the mother liquor. And likewise the amount of potassium sulphate and urea added may vary considerably according to the percentage of potash and nitrogen desired in the finished product.

I claim:

1. Process of manufacturing compound fertilizers from the solution which is obtained by treating phosphate rock and similar phosphate material with nitric acid and crystallizing the greater part of the calcium nitrate contained in said solution, comprising adding mineral phosphates and potassium sulphate to the mother liquor from the crystallization of calcium nitrate and removing the surplus of water.

2. Process of manufacturing compound fertilizers from the solution which is obtained by treating phosphate rock and similar phosphate material with nitric acid and crystallizing the greater part of the calcium nitrate contained in said solution, comprising adding mineral phosphates and potassium sulphate and urea to the mother liquor from the calcium nitrate crystals and removing the surplus of water.

3. Process of manufacturing compound fertilizers from the solution which is obtained by treating phosphate rock and similar phosphate material with nitric acid and crystallizing the greater part of the calcium nitrate contained in said solution, comprising adding mineral phosphates and potassium sulphate to the mother liquor from the calcium nitrate crystals, removing the surplus of water and admixing urea to the product so obtained.

In testimony that I claim the foregoing as my invention I have signed my name.

ERLING JOHNSON.